US007016924B2

(12) United States Patent
Nakabe et al.

(10) Patent No.: US 7,016,924 B2
(45) Date of Patent: Mar. 21, 2006

(54) CONTACTLESS IC CARD, RESPONDING METHOD, AND PROGRAM THEREFOR

(75) Inventors: Futoshi Nakabe, Hiroshima-ken (JP); Shinji Kawano, Hiroshima-ken (JP); Tadakatsu Masaki, Hiroshima-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 642 days.

(21) Appl. No.: 09/976,223

(22) Filed: Oct. 15, 2001

(65) Prior Publication Data
US 2002/0046226 A1 Apr. 18, 2002

(30) Foreign Application Priority Data
Oct. 13, 2000 (JP) .............................. 2000-313150

(51) Int. Cl.
G06F 1/02 (2006.01)
(52) U.S. Cl. .................................... 708/250
(58) Field of Classification Search ......... 708/250–256
See application file for complete search history.

(56) References Cited
U.S. PATENT DOCUMENTS 5,068,894 A * 11/1991 Hoppe ........................ 708/250
5,675,649 A * 10/1997 Brennan et al. ............. 708/250
5,740,088 A * 4/1998 Nakagawa et al. .......... 708/253
5,778,069 A * 7/1998 Thomlinson et al. ........ 708/250
6,002,344 A 12/1999 Bandy et al.
6,040,786 A 3/2000 Fujioka
6,324,558 B1 * 11/2001 Wilber ....................... 708/255
6,480,869 B1 * 11/2002 Fujioka ...................... 708/252
6,678,707 B1 * 1/2004 Butler ........................ 708/250
2002/0015491 A1 * 2/2002 Nishioka et al.
2003/0028567 A1 * 2/2003 Carlson ...................... 708/250

FOREIGN PATENT DOCUMENTS

| JP | 09-006934 | 1/1997 |
| JP | 9-198471 | 7/1997 |
| JP | 11-205334 | 7/1999 |
| WO | WO 94/05131 | 3/1994 |

* cited by examiner

Primary Examiner—Kakali Chaki
Assistant Examiner—Chat C. Do
(74) Attorney, Agent, or Firm—McDermott Will & Emery LLP

(57) ABSTRACT

A contactless integrated circuit (IC) card for providing a high-grade random number with a simple configuration. A plurality of provisional random numbers are generated according to a part of calculations to be used for generation of a random number. The plurality of provisional random numbers generated are stored. A random number is generated on the basis of one of the provisional random numbers selected in sequential order.

10 Claims, 12 Drawing Sheets

Fig. 11
(a)
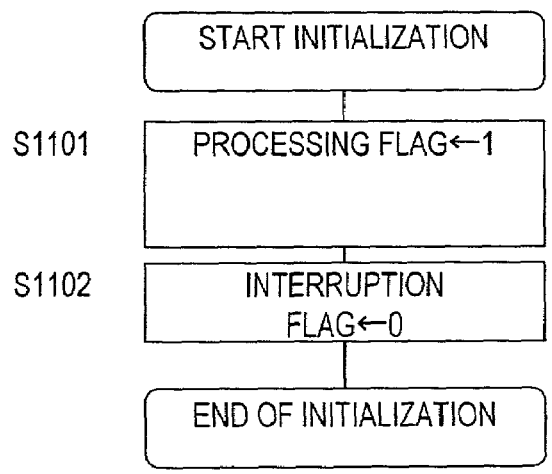
(b)
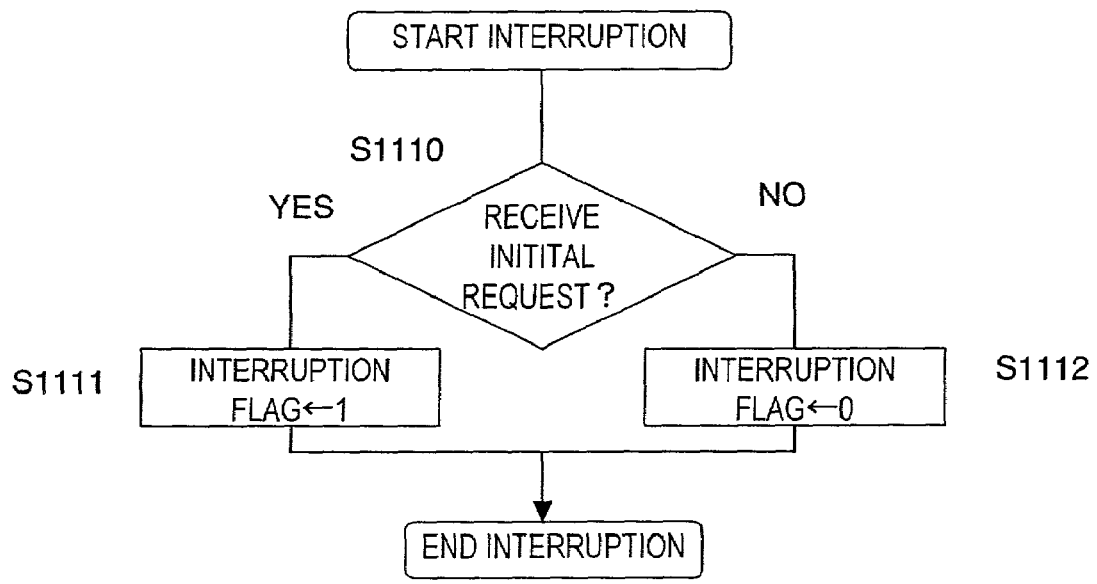

CONTACTLESS IC CARD, RESPONDING METHOD, AND PROGRAM THEREFOR

BACKGROUND OF THE INVENTION

1. Field of the Invention

This invention relates to a contactless IC card, a responding method, and a program thereof, and more specifically the contactless IC card, the responding method, and the program that enable to respond to a request sent from a reader/writer by means of a value calculated on the basis of a random number.

2. Prior Art of the Invention

Generally, the time slot method has been applied to the communication between a contactless IC card and a reader/writer; the contactless IC card for sending and receiving data by means of the electromagnetic induction method and the reader/writer for recognizing the contactless IC card. This is because; if a plurality of contactless IC cards exist at a time within a communication area of a reader/writer and when the plurality of contactless IC cards respond to the polling of the reader/writer at a time, each response signal used for the response is in collision with each other and no contactless IC card can communicate with the reader/writer normally.

The communication of the time slot method will be explained hereafter.

(1) In order to recognize the existence of the contactless IC card, the reader/writer sends as a request an initial request to the contactless IC card. The initial request includes slot numbers needed for the timing control of the initial response executed by the contactless IC card or a value needed for calculating the slot numbers.

(2) The contactless IC card sends back the initial response by means of time slots (from 1 to slot numbers) started at intervals of a specific time immediately after the contactless IC card receives the initial request. The time slot is defined as a continuously repeating interval of time. Selecting the time slot can determine the timing for response. The timing for response, that is to say a time slot to be used for the response, can be determined on the basis of a random number by the card itself.

(3) If the reader/writer detects the collision of the initial responses, the collision generating when a plurality of contactless IC cards select the same time slot, the reader/writer resends an initial request and thereby a new time slot is selected. It is general that the time slot numbers included in the resent initial request is more than that in the previous initial request.

(4) The reader/writer recognizes all of contactless IC cards by normally receiving the initial responses from all of contactless IC cards and completes the sequence for identifying the contactless IC cards.

As such system, a wireless identification device is disclosed in Japanese laid-open publication No. 9-6934.

Besides, another method similar to the time slot method is a slot marker method. The slot maker method is a one that after sending out the initial request the reader/writer sends the slot marker command representing the start of the slot per the start timing of each slot.

In Japanese laid-open publication No. 9-6934, the wireless identification device has to decide the delay time using the random number after an ID card (a contactless IC card) receives a polling from a sending-receiving decoder (a reader/writer) until the card sends a response signal (a response), as described above.

In case of using a low-grade random number as the above-identified random number, that is a random number generated by a system generating biased random numbers at generating a random number in plural times, it happens frequently that a plurality of contactless IC cards generates the same random number. And so, it occurs many collisions of the initial response, which causes the reader/writer to delay the completion of the sequence for card identification. Otherwise, in the worst case, when the contactless IC card continues to generate the same random number, there is a problem that any sequence for the card identification is not completed. In case of applying a contactless IC card to a system like a ticket gate that users need to make a reader/writer recognize the contactless IC cards without intermission, the impediment occurs in the utilization of the system because of the delay of the card identification.

Therefore, instead of the low-grade random number, it is necessary to use a high-grade random number generated by a system not generating biased random numbers at generating a random number in plural times.

However, in order to acquire the high-grade random number, it is necessary to perform more complicated calculations than those for acquiring the low-grade random number. Therefore, in case of generating the high-grade random number by software, the software needs to use CPU (Central Processing Unit) capable of the high-speed processing. But using the CPU capable of the high-speed processing needs a huge volume of electric power. In this case, the power to be used by the CPU per unit time is small in the electromagnetic induction type of the power supplying method like a contactless IC card, and it is not possible to supply the electric power enough to generate the high-grade random number. Therefore when the calculation is executed for generating the high-grade random number by using the available power, it takes a long time. And in result, since the time slot ends before the calculations of the random number are completed, the contactless IC card cannot send the initial response. It is another problem.

In addition, the high-grade random number generally can be provided in a short time when the hardware generates them rather than when the software generates them. In this case, there is a problem that the device is complicated because a specific circuit is needed only for generating the random number, and it cause to increase the price. Particularly, the contactless IC card is restricted to its size and needs for the flexibility in some degree, therefore such impediment that the hardware provides the random number might be considered as a large problem.

SUMMARY OF THE INVENTION

The invention has an object, by providing a high-grade random number by a simple configuration, to provide the contactless IC card, the responding method, and the program that enable to control the collisions in minimum at the initial response.

In order to achieve the above object, the invention adopts the following means. Specifically, the invention presupposes that a contactless IC card makes a response to a request sent from a reader/writer by using a value calculated on the basis of a provisional random number. The provisional random number generating means generates a provisional random number according to a part of operations to be used for generating a random number. The generated provisional random number is stored in the provisional random number storage means, and the random number generating means generates a random number on the basis of the stored provisional random number at the time of receiving the request from the reader/writer.

As described above, dividing the processing for generating a random number makes a load of operations small, said operations for generating a random number after receiving the request. Thereby, it is possible to satisfy the time regulation of the time slot. In addition, processing with huge operation volume can be applied to the random number generation, said processing capable of generating a high-grade random number. Thereby, it is possible to settle the problem generated by the low-grade random number.

It is possible to acquire the high-grade random number by means of the software instead of using the hardware for the random number generation. Thereby it is possible to reduce the cost of the contactless IC card. And it does not occur any trouble about the design and the strength caused from hardware.

Besides, the operations for generating the provisional random number can be considered as those not related to the request. The operations for generating the random number can be considered as those determined on the basis of the request.

In addition to the above configuration, the contactless IC card comprises a plurality of the provisional random number storage means, and sends a response to the request from the reader/writer by using the plurality of provisional random numbers in sequential order.

In such configuration, it is possible to reuse in sequential order the provisional random numbers generated before. In result, even when the request is sent from the reader/writer consecutively, it is possible to generate the random number immediately; the initial request always can be sent by using a high-grade random number.

The self-response timing judging means judges if there is a specific time until the timing to response by the card itself, while the provisional random number generating means generates the provisional random number when the self-response timing judging means determines that there is a specific time until the timing to response by the card itself.

In such configuration, the self-response timing judging means judges if there is a specific time until the timing to response by the card itself, thereby the provisional random number can be generated at a slot that is not related to the card itself but is a waiting time actually.

Moreover, the provisional random number storage means is nonvolatile, and the provisional random number generating means generates the provisional random number at the end of the communication and stores it in the nonvolatile provisional random number storage mean. The random number generating means generates the random number on the basis of the provisional random number stored in the nonvolatile provisional random number storage means at receiving the request.

In such configuration, after the contactless IC card ends the communication with the reader/writer and when the contactless IC card is within the communication area of the reader/writer, since the contactless IC card can be supplied with the electronic power, it is possible to generate the provisional random number in advance. And since the generated provisional random number is stored in the non-volatile provisional random number storage means, if next time the contactless IC card enters within the communication area of the reader/writer, it is possible to generate the high-grade random number immediately.

The contactless IC card of the invention comprises an interruption flag representing that the processing for generating provisional random numbers should be interrupted when the request from the reader/writer is received in the middle of the provisional random number generation and a processing flag representing a position from which the provisional random number generation should start after the end of response to the request. And on the basis of the interruption flag and the processing flag, the provisional random number generation should be interrupted or restart.

In such configuration, it is possible to interrupt the processing for generating provisional random numbers even when the request from the reader/writer is received in the middle of the provisional random number generation and then make a response to that request. Immediately after that, it is possible to restart the provisional random numbers generation. Therefore, it is possible to reduce the processing like those at the activation time of programs.

In addition, since the specific slot number storing means stores a specific value, the contactless IC card of the invention can interrupt the provisional random number generation at receiving the request in the middle of the provisional random number generation, and make a response to the request by using the value stored in the specific slot number storing means.

The contactless IC card configured as above can make a response to the request within a specific time even when the provisional random number storage means does not store a valid provisional random number.

Under such configuration, a value stored in the specific slot number storing means may be 1.

When a value stored in the specific slot number storing means is 1, the contactless IC card sends the initial response at slot 1, and thereby it is possible to use other slots to calculate the provisional random number. Therefore, if there are collisions of response signals of the other contactless IC cards at the first initial request, the contactless IC card can ensure the time for calculating the provisional random number enough to send a response to the second initial request.

BRIEF DESCRIPTION OF THE DRAWINGS

FIG. 11 is a flowchart showing the initialization processing and the interruption processing of a contactless IC card.

DESCRIPTION OF THE PREFERRED EMBODIMENTS

In order to understand the invention, the explanation will be made according to the preferred embodiment and referring to the attached drawings. Besides, the following embodiments are examples describing the invention concretely and are not restricted to the technical field of the invention.

Figure 1:
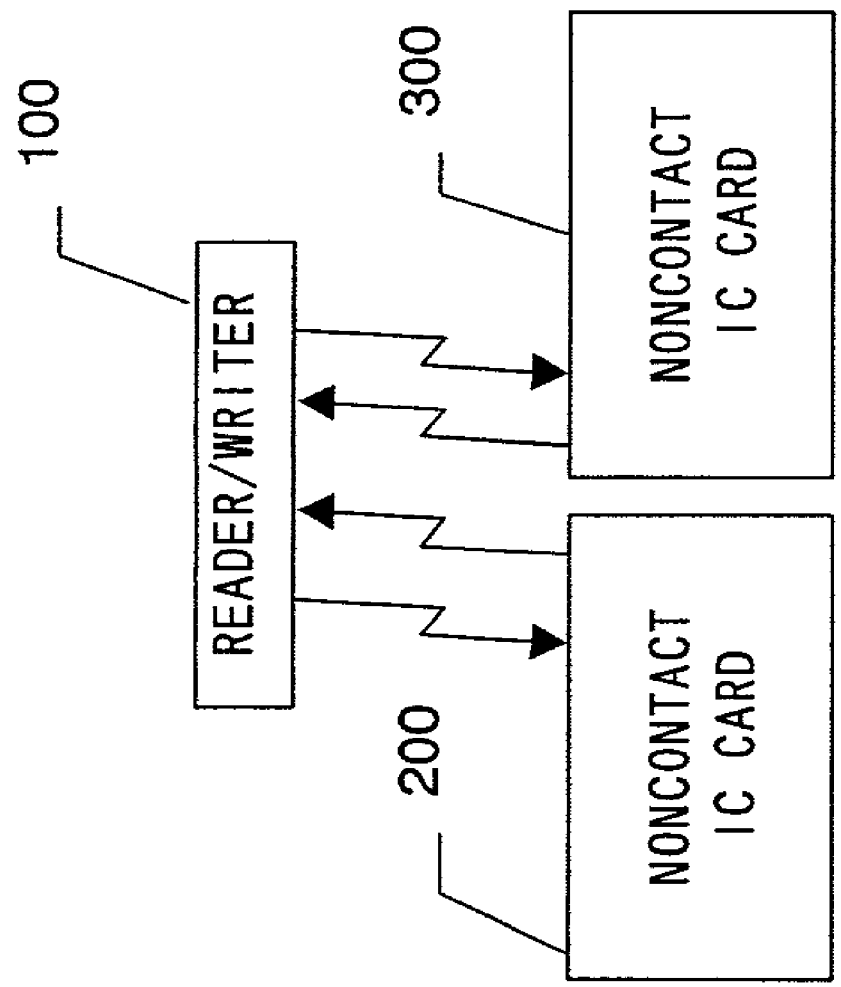
FIG. 1 is a diagram showing a status that a contactless IC card is applied to the invention.
Figure 2:
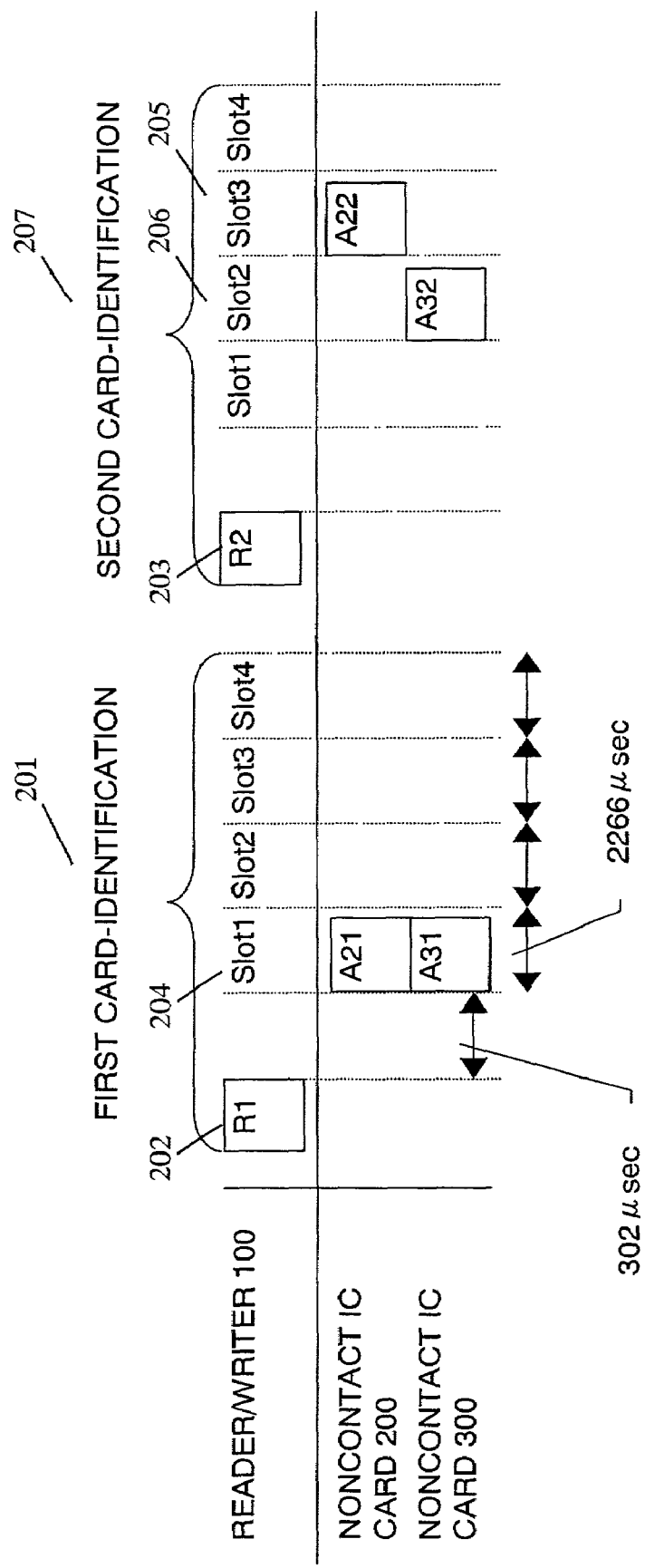
FIG. 2 is a time chart showing the communication status between a contactless IC card and a reader/writer of contactless IC card.
Figure 3:
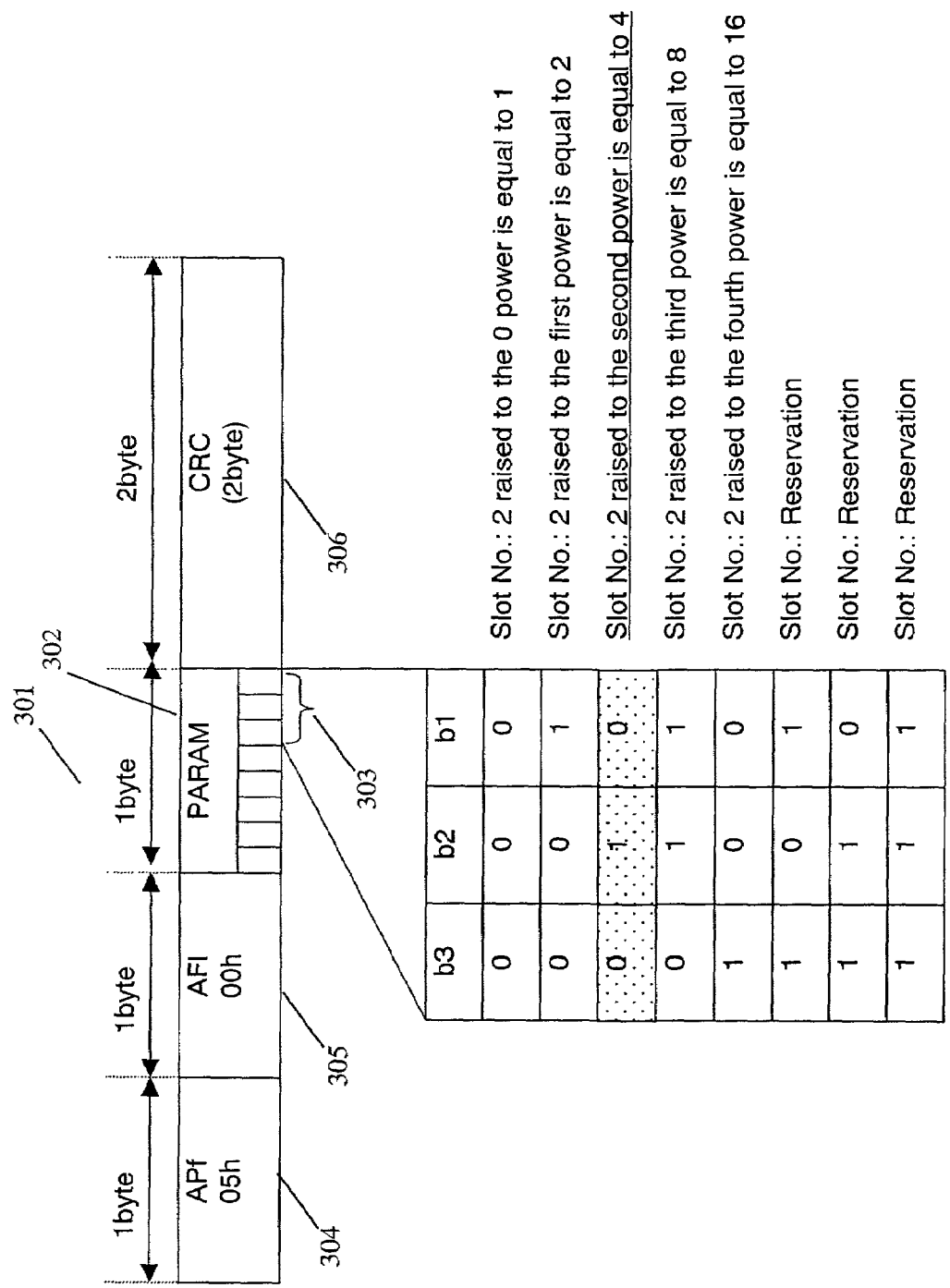
FIG. 3 is a diagram showing a format of initial request of the invention.

First, referring to FIGS. 1, 2, and 3, here are explained in brief about the processing of a contactless IC card adapted to ISO/IEC14443, the international standard of a proximate type of contactless IC card.

ISO/IEC14443 can be adapted to a contactless telephone card, for example. More specifically, as shown in FIG. 1, it is assumed that contactless IC cards 200 and 300 functioning as a telephone card are inserted (in proximate) into a reader/writer 100 functioning as a public phone at a time.

In the recognition system of contactless IC card of ISO/IEC14443, the recognition of contactless IC card is executed according to the following procedure.

First, the reader/writer 100 as a public phone sends an initial request (request). The initial request has a format shown in FIG. 3 and notifies a contactless IC card of time slot numbers (N) by using three bits 303 consisting of bit 1 to bit 3, those included in 8 bits of PARAM 302 composing the initial request 301. Besides, APf 304 is a header represents the initial request command, while AFI 305 represents an adaptable class for contactless IC card. And CRC (Cyclic Redundancy Check) 306 is CRC from APf to PARAM.

Besides the contactless IC card can respond by means of either one of N numbers of slots, and the numbers of time slots is assumed to 4 in this embodiment. That is to say, the contactless IC card 200 and 300 performs an initial response to the initial request by selecting one among the time slots from 1 to 4.

In a first card-identification processing 201 shown in FIG. 2, the reader/writer 100 sends an initial request R1[REQB] (202). When the contactless IC cards 200 and 300 generate "1" respectively as random number in response to the initial request R1 (202), the contactless IC cards respond with initial response [ATQB] A21 and A31 according to the time slot 1 (204) respectively. In this case, since the contactless IC cards both 200 and 300 perform the initial response at the same timing, the reader/writer 100 detects the collision of the contactless IC cards. Accordingly, the reader/writer 100 restarts the card-identification processing again.

In a second card-identification processing 207, the reader/writer 100 sends the initial request R2 (203). In response to the initial request, when the contactless IC cards 200 and 300 generates "3" and "2" respectively, the contactless IC cards respond with a packet A22 according to the time slot 3 (205) and a packet A32 according to the time slot 2 (206) respectively. In this case, since the reader/writer 100 does not detect the collision, the reader/writer can identify all contactless IC cards, and complete the card-identification processing. That description is the identification processing of contactless IC card meeting the ISO/IEC 14443 standard. Under the ISO/IEC 14443 standard, the time period after the contactless IC card receives the initial request command until the card responds with the time slot 1 is regulated as 302 $\mu$ sec, and the (time) period of a time slot is as 2266 $\mu$ sec. The time ($\mu$ sec) after the contactless IC card receives the initial request from the reader/writer until the card sends out the initial response can be found according to the following expression (Expression 1).

$$\text{Time } (\mu \text{ sec}) = 302\ \mu\ \text{sec} + 2266\ \mu\ \text{sec} \times (\text{slot number (N)} - 1) \quad \text{Expression 1}$$

[Embodiment 1]

The following description explains about contactless IC card system comprising the reader/writer 100 and a plurality of contactless IC cards 200, 300, . . . . in the embodiment 1 of this invention. Since the configuration of contactless IC cards 200 and 300 is the same, the explanation will refer to the contactless IC card 200, mainly.

Figure 4:
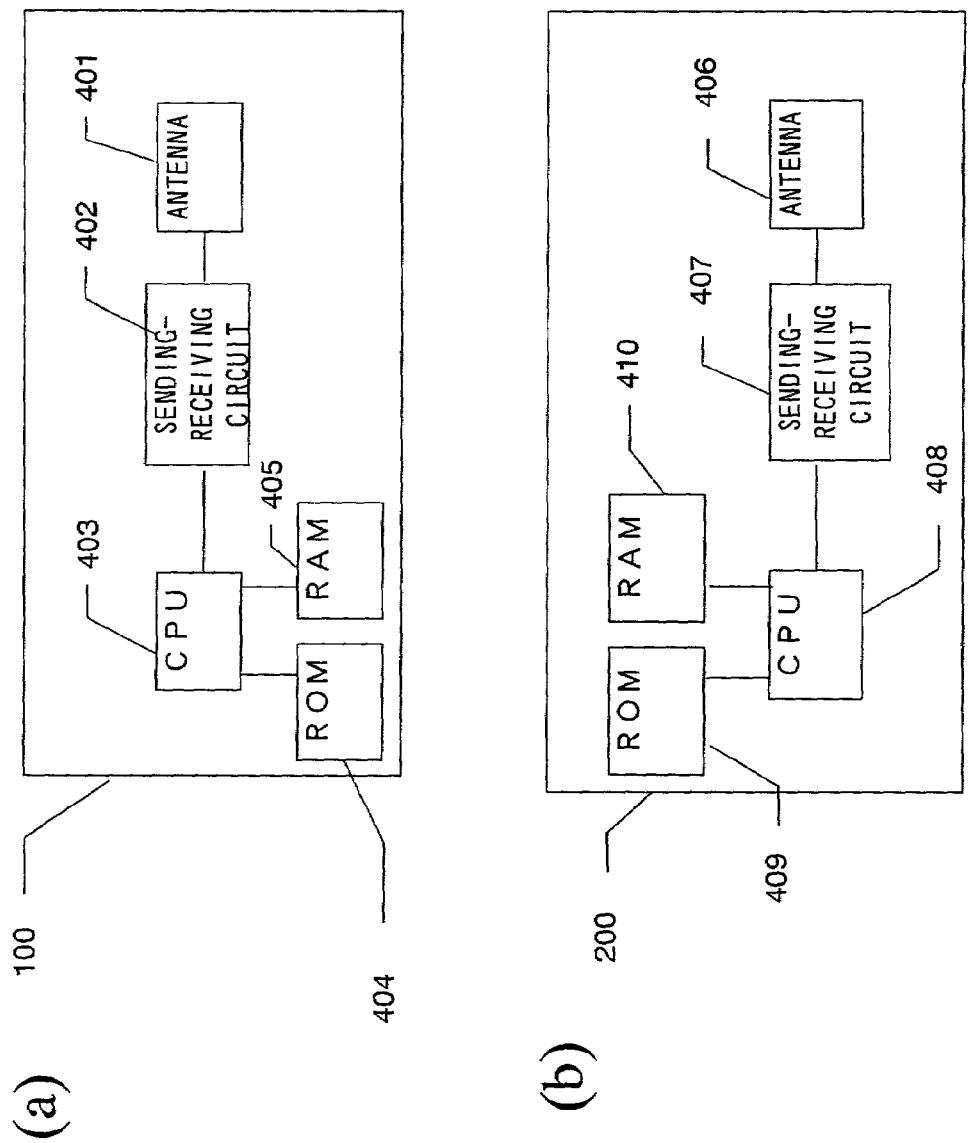
FIG. 4 is a diagram showing a configuration of a reader/writer composing a recognition system of contactless IC card and a configuration of a contactless IC card.

FIG. 4(*a*) is a diagram showing the configuration of the reader/writer 100 in the embodiment 1. The reader/writer 100 comprises an antenna 401, a sending-receiving circuit 402, CPU 403, ROM (Read Only Memory) 404 storing a program for controlling the reader/writer, and RAM (Random Access Memory) 405 utilized as a working area, for example, at executing the program.

FIG. 4(*b*) is a functional block diagram showing the configuration of the contactless IC card 200. The contactless IC card 200 comprises an antenna 406, a sending-receiving circuit 407, CPU 408 for executing each program, ROM (Read Only Memory) 409 storing the control program for processing commands sent from the reader/writer, and RAM (Random Access Memory) 410 utilized as a working area, for example, at executing the program. When entering in a communication area of the reader/writer 100, the contactless IC card 200 works by the power inducted by the electromagnetic wave of the reader/writer 100. Therefore, it is not possible to supply the large electricity power to the contactless IC card, which has been described before.

Figure 5:
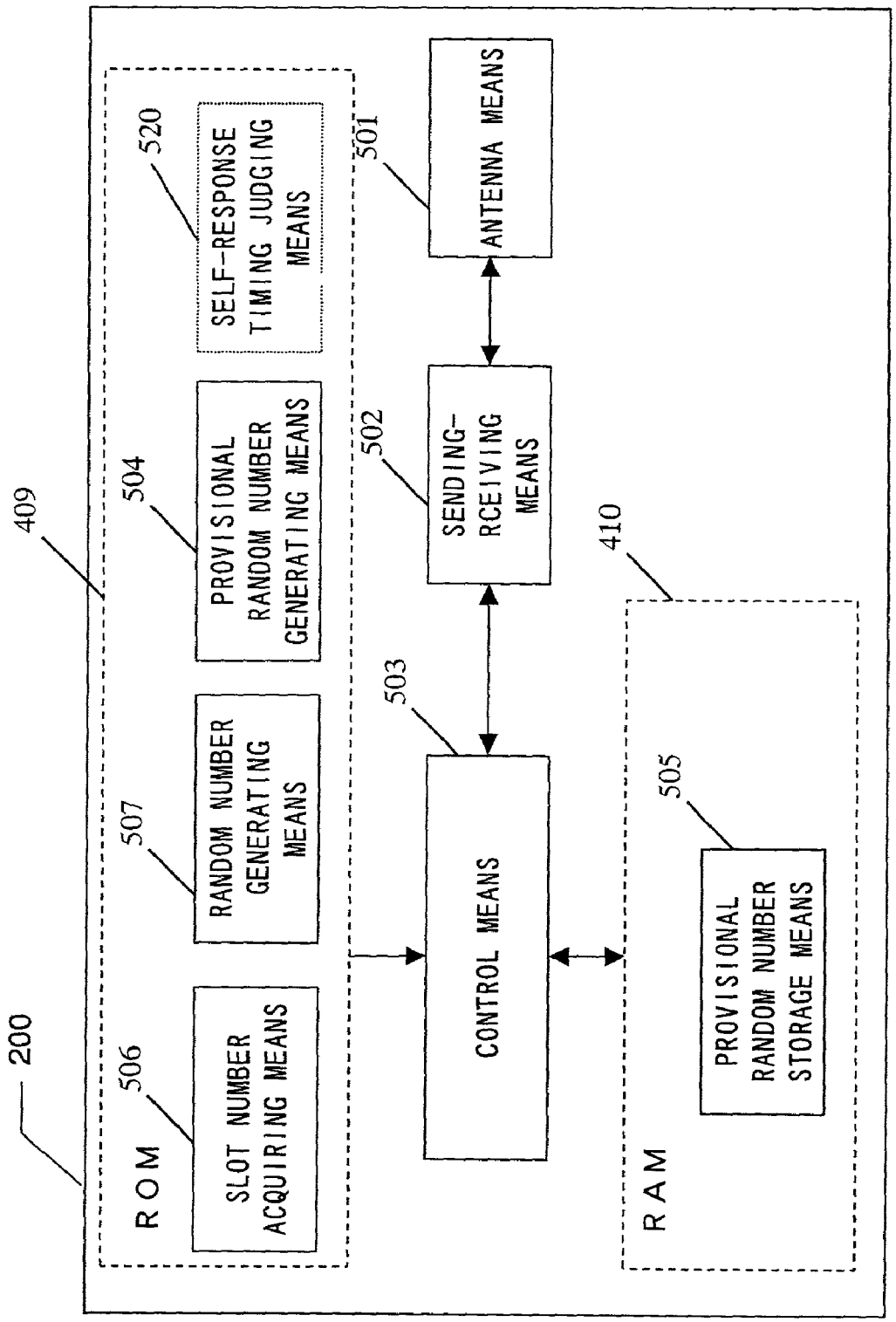
FIG. 5 is a functional block diagram showing a configuration of a contactless IC card.

The functional block diagram referring to the contactless IC card 200 in FIG. 4(*b*) is shown in FIG. 5. That is to say, the contactless IC card 200 comprises antenna means 501, a sending-receiving means 502, control means 503, provisional random number generating means 504 for generating high-grade random number, provisional random number storage means 505 for storing the provisional random number, slot number acquiring means 506 for acquiring slot numbers from the received initial request command, and random number generating means 507 for generating a random number from the provisional random number stored in the provisional random number storage means 505. Besides, the provisional random number generating means 504, the slot number acquiring means 506, and the random number generating means 507 are comprised in ROM 409 shown in FIG. 4(*b*), which are read out and executed on demand by the CPU 408.

Figure 6:
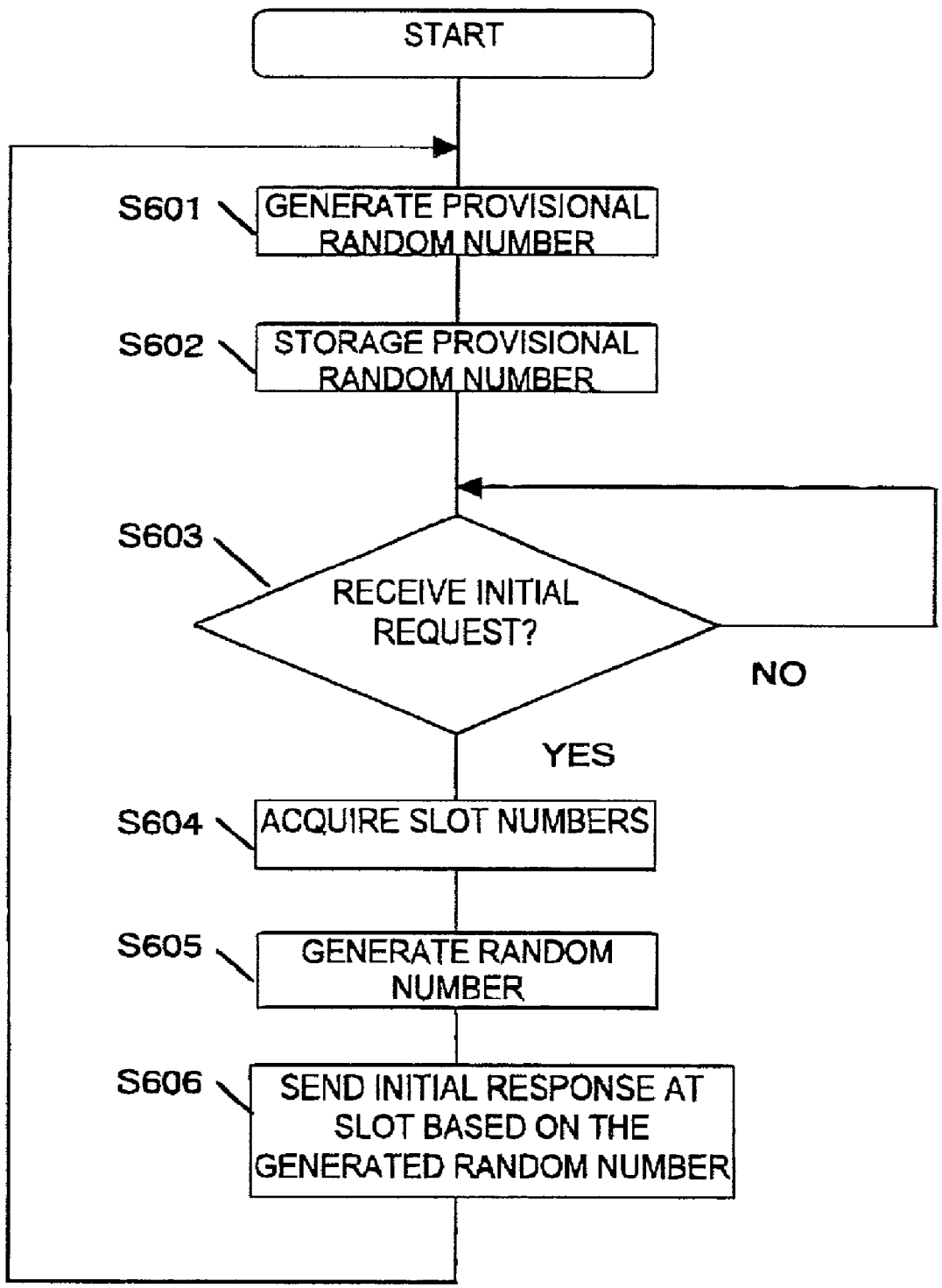
FIG. 6 is a flowchart of the initial response processing executed by a contactless IC card of the embodiment 1.

Next, the following refers to the processing of contactless IC card in the embodiment 1 according to FIG. 6. Besides, FIG. 6 is a flowchart of the communication executed by the contactless IC card.

First, the provisional random number generating means 504 composing the contactless IC card 200 generates a provisional random number (r) in advance so as to generate a high-grade random number at a specific timing like the time of activating the program (FIG. 6: S601). The provisional random number is a value found by specific numbers of calculation steps included in a plurality of calculation steps need to generate the random number. For instance, when the number of steps needed to generate the random number is 100, a value inducted by the 90 steps at the front stage of the necessary steps or the like gets to be the provisional random number. In other words, the calculations that are not concerned with the step numbers (N) (with the request) described later can be the step for generating the provisional random number. The time of activating the program is a case where the contactless IC card inducts the power from the electromagnetic wave of the reader/writer 100 after entering in the communication area of the reader/writer 100.

It is preferable that the method for making the random number sufficiently high-grade is applied to the invention. For instance, the random number generating method in Japanese Patent application No. 11-177913 discloses concrete examples. But the algorithm for generating the high-grade random number is not concerned with this invention directly; therefore the detailed explanation was not described here.

The provisional random number (r) generated by the provisional random number generating means 504 is stored in the provisional random number storage 505 equipped in RAM 410 (FIG. 6: S602).

Next, the provisional random number generating means 504 waits for an initial request (request) to be sent from the reader/writer 100 (FIG. 6: S603, NO). The antenna means 501 receives the electromagnetic wave from the reader/writer 100. If the electromagnetic wave includes the initial request, the initial request is received by the control means 403 through the sending-receiving means 502. After that, the control means 503 sends the initial request to the slot number acquiring means 506, and then the slot number acquiring means 506 acquires the slot numbers from the initial request (FIG. 6 : S603, YES to S604). The slot numbers has been designated in Bit 1 to Bit 3 of PARAM 302 shown in FIG. 3, and the value is 2 multiplied the bit-designated number times. The expression for calculating the slot numbers is as follows:

Slot numbers (*N*)=2^n    Expressions 2

(n is a value from 0 to 4 that are described in Bit 1 to Bit 3)

The slot numbers (N), which is acquired (calculated) by the slot number acquiring means 506, is sent to the control means 503.

After receiving the slot numbers (N), the control means 503 sends the provisional random number (r) stored in the provisional random number storage means 505 together with the slot numbers (N) toward the random number generating means 507.

After receiving the slot numbers (N) and the provisional random number (r), the random number generating means 507 generates a random number (real random number) (R) on the basis of the above two values (FIG. 6: S605). The processing for generating the random number (R) on the basis of the provisional random number (r) may be executed according to all steps but the specific steps processed at the time of generating the provisional random number; those steps needed to generate the random number. Such remained steps cannot be executed if the slot numbers (N) is not found. That is to say, it is the step that is concerned with the slot numbers (N) (request).

The following shows an example of an expression for calculating the random number (R) (Expression 3).

Random number(*R*)=Provisional random number(*r*)%
Slot numbers (*N*)+1    Expression 3

(%:Residue operation)

The calculative expression (Expression 3) may be replaced with other one that can satisfy the regulated response time of the time slot.

The random number generated by the random number generating means 507 is sent to the control means 503.

According to the above steps, it is possible for the contactless IC card to acquire the desired random number (from 1 to slot numbers (N)). After that, the reader/writer 100 performs the initial response at the timing based on the random number (slot) (FIG. 6: S606). After completing the initial response, it turns back again to Step S601 for generating the provisional random number (r), and then a series of the initial responses is completed.

As described above, since the processing for generating the random number is divided, the calculation load can be reduced in the processing for generating the random number (R) after receiving the initial request. Accordingly, in case of the contactless IC card of the ISO/IEC14443 standard, it is possible to satisfy the time regulation of the time slot. In addition, it is possible to apply the processing with huge calculation volume and capable of generating high-grade random number to the random number generation; thereby the problem caused by the low-grade random number can be solved.

Additionally, in case of the contactless IC card that cannot be supplied with enough power to generate the high-grade random number, it is possible to acquire the high-grade random number only by using the software instead of using the hardware for generating the random number; thereby it is possible to reduce the cost of the contactless IC card. This configuration does not generate any trouble of the design and strength caused by using the hardware.

Though it is arranged in the embodiment 1 that the software is used in order to generate the random number, the hardware may generate the high-grade random number. In this case, since the utilized hardware is capable of generating the random number more speedy than the software, it is possible to perform the processing of generating the high-grade random number that is needed for many steps. And the contactless IC card 200 is configured to applying the hardware circuit to the provisional random number generating means.

[Embodiment 2]

Figure 7:
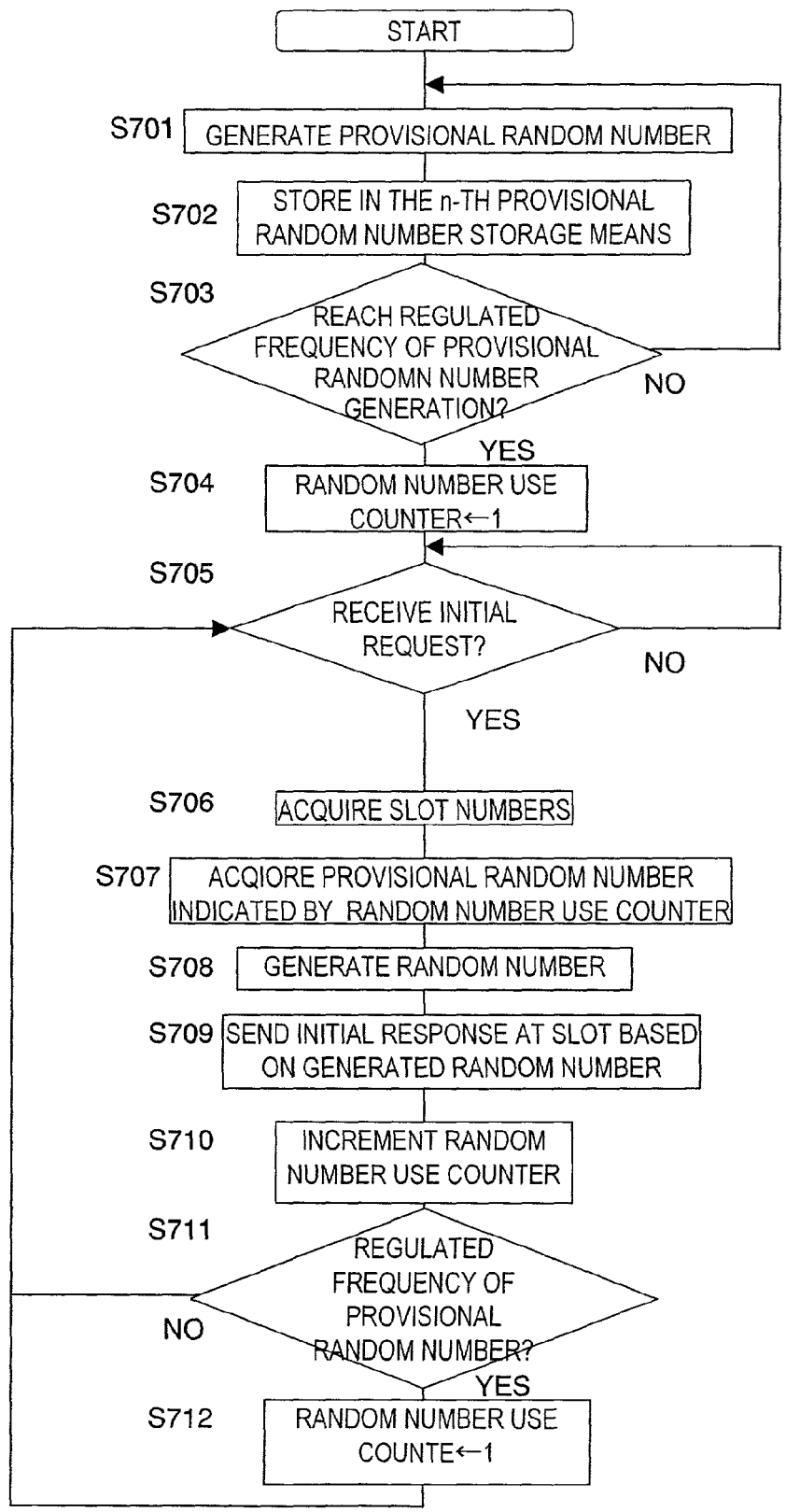
FIG. 7 is a flowchart of the initial response processing executed by a contactless IC card of the embodiment 2.

The following explanation refers to the embodiment 2 of the invention. FIG. 7 is a flowchart of the communication executed by the contactless IC card of the embodiment 2.

The contactless IC card described in the embodiment 1 has a following problem: when the reader/write resends the initial request immediately after the contactless IC card responds to the prior initial request, if the contactless IC card is in the processing for generating the provisional random number, the contactless IC card cannot sends the next initial response. In the embodiment 2, it is provided with means for settling the problem. Besides, the contactless IC card in the embodiment 2 has the almost same configuration as that of the embodiment 1, therefore the following description explains about the different matters.

The provisional random number generating means 504 composing the contactless IC card 200 generates the provisional random number (r(n)) at the specific timing like the time of activating programs, for example (FIG. 7: S701). The "n" is defined as the frequency for generating the provisional random number, and represented by a value from 1 to the regulated frequency for generating the provisional random number. The regulated frequency for generating the provisional random number is a value for deciding how many times the provisional random number should be generated, and is replace with a constant decided by a program or a variable allocated in the RAM 410 and ROM 409.

The generation of the provisional random number should adopt the method for generating the high-grade random number, like the embodiment 1.

The provisional random number (r(n)) generated by the provisional random number generating means 504 is stored in the provisional random number storage means 505 through the control means 503 (FIG. 7: S702). At this time, the contactless IC card 200 of the embodiment 2 is provided with a plurality of the provisional random number storage means 505, and for instance the provisional random number (r(n)) generated as above is stored in the provisional random number storage means 505(n).

After the provisional random number is stored in the provisional random number storage means 505(n), the control means 503 confirms how many times the provisional random number were generated by the random number generate counter (FIG. 7: S703). The random number generate counter is a variable for storing the number of the provisional random number (r(n)) generated by the provisional random number generating means 504, which is allocated in RAM 410 of the contactless IC card 200.

If the frequency for generating the provisional random number does not reach the regulated frequency, the provisional random number is generated again in accordance with the instruction of the control means 503 (FIG. 7: S703 NO to S701).

If the frequency for generating the provisional random number reaches the regulated frequency, a random number use counter is initialized by 1 (FIG. 7: S703 YES to S704). The random number use counter is a variable for storing the number of the provisional random number (r(n)) to be used for generating random number next, which is allocated in RAM 410 of the contactless IC card 200.

According to the above processing, a plurality of provisional random number are generated and stored in the provisional random number storage means 505 respectively.

Next, the contactless IC card 200 should wait for the initial request sent from the reader/writer 100 (FIG. 7: S705, NO). The antenna means 501 receives the electromagnetic waves from the reader writer 100. If the waves include the initial request, the initial request is received by the control mans 503 through the sending-receiving means 502. The sending-receiving means 503 sends the initial request to the slot number acquiring means 506, and the slot number acquiring means 506 acquires (calculates) the slot numbers on the basis of the initial request. Those steps are the same as in the embodiment 1 (FIG. 7: S705, YES to S706).

Subsequently, the control means 503 acquires the slot numbers (N), and then sends to the random number generating means the provisional random number (r(n)) stored in the provisional random number storage means 505 together with the slot number (N). However, the provisional random number (r(n)) to be used here is a value based on the random number use counter and is defined as the random number (r(1)) here.

The random number generating means 507 that has received slot numbers (N) and the provisional random number (r(1)) generates a random number (a true random number) (R) based on the received two values (FIG. 7: S708).

An example (Expression 4) for calculating the random number (R) is shown as follows.

$$\text{True Random Number}(R) = \text{Provisional Random Number}(r(n))\% \text{ SlotNumbers}(N) + 1 \quad \text{Expression 4}$$

(%:Residue operation, n: Value of provisional random number use counter) The above expression (Expression 4) may be replaced with other expressions if those can satisfy the regulated time for the time slot to respond to the initial request.

According to the above steps, the contactless IC card 200 can acquire a desired random number (from 1 to N (slot number)). After this, the contactless IC card 200 responds to the reader/writer 100 at the timing (the slot) based on the random number (FIG. 7: S709).

After completing the initial response, the control means 503 increments the value of the random number use counter (+1) (FIG. 7: S710).

At this time, if the value of the random number use counter does not reach the regulated frequency for generating the random number, the contactless IC card 200 waits for the initial request to be sent again from the reader/writer 100 (FIG. 7: S711 NO to S705).

On the other hand, if the value of the random number use counter reaches the regulated frequency for generating the random number, the value of the random number use counter is initialized to 1, and then it turns to the step S504 that waits for the initial request again (FIG. 7: S711 YES to S712 to S705).

According to the above operations, it is possible to make a reuse of the generated random number sequentially from the first. Therefore, if the initial requests are sent from the reader/writer 100 one after another, it is possible to generate the random numbers immediately. Consequently, it is possible to perform the initial response by using the high-grade random number at any time.

[Embodiment 3]

The following explains about the embodiment 3 of the invention.

Figure 8:
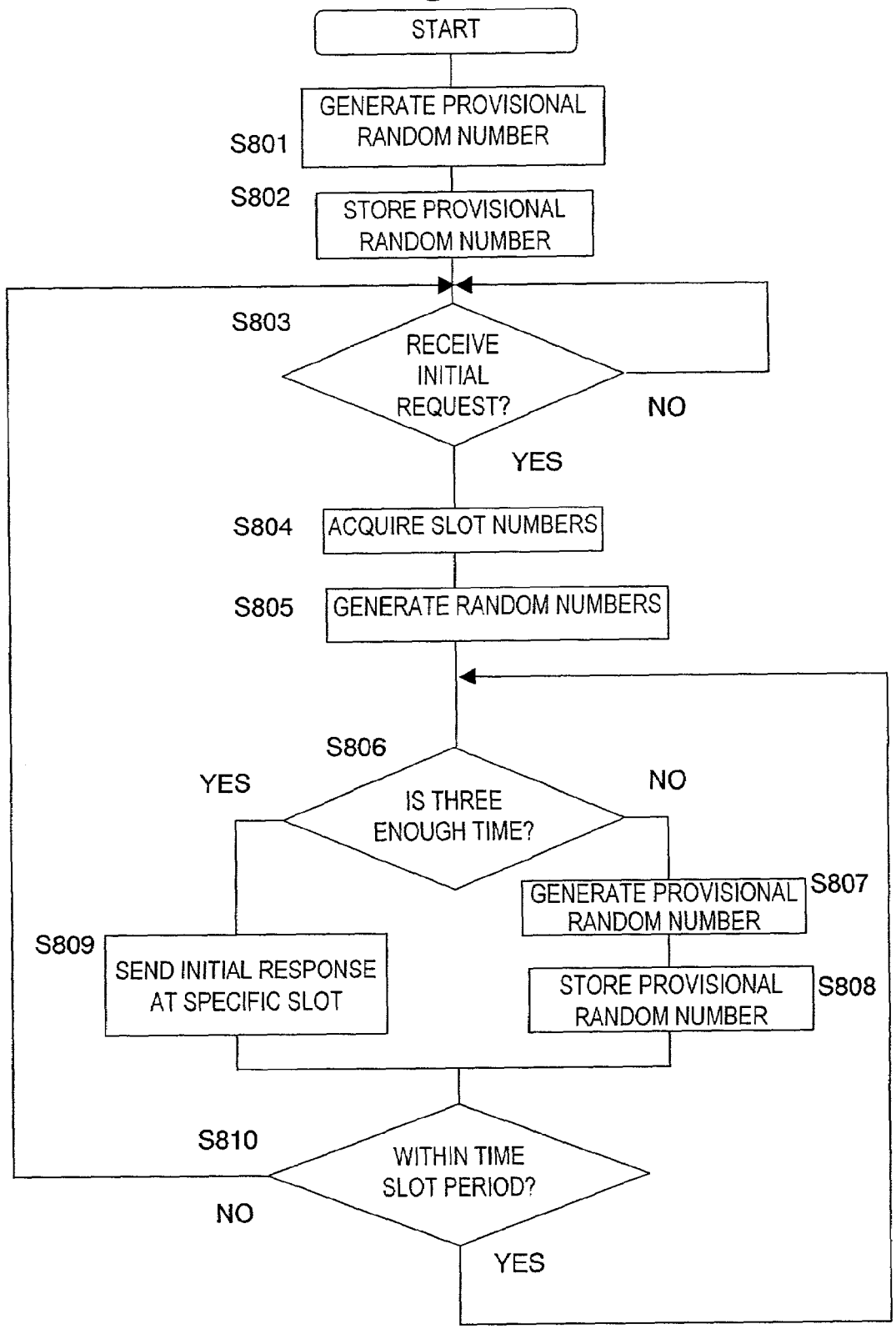
FIG. 8 is a flowchart of the initial response processing executed by a contactless IC card of the embodiment 3.

FIG. 8 is a flowchart of the communication executed by the contactless IC card 200 in the embodiment 3.

As described before, there is a problem that the contactless IC card of the embodiment 1 cannot perform a succeeding initial response in the following case: that is to say, when the reader/write resends the initial request immediately after the contactless IC card responds to the prior initial request, if the contactless IC card is in the processing for generating the provisional random number, the contactless IC card cannot sends the next initial response. And there is another problem in the embodiment 2 that it takes a specific time for the contactless IC card to be ready for receiving the initial request because generating a plurality of random numbers needs the processing time. In order to settle those problems, it is arranged in the embodiment 3 that the contactless IC card is provided with self-response timing judging means 520. Besides the contactless IC card in the embodiment 3 is configured as same as that of the embodiments 1 and 2, so that the explanation may refer to different points.

The provisional random number generating means 504 comprised the contactless IC card 200 generates the provisional random number (r) at a specific timing like the activation time of program, for example (FIG. 8: S801).

The provisional random number (r) generated by the provisional random number generating means 504 is stored in the provisional random number storage means 505 (FIG.

8: S802) Next, the contactless IC card 200 waits for the initial request to be sent from the reader/writer 100 (FIG. 8: S803, NO) In case of receiving the initial request, the lot number acquiring means 506 acquires the slot numbers from the initial request (FIG. 8: S803, YES to S804).

Next, the random number generating means 507 generates the random number (R) on the basis of the slot numbers (N) and the provisional random number (r) stored in the provisional random number storage means (FIG. 8: S805).

According to the above steps, the contactless IC card 200 can acquire the desired random number (from 1 to N (slot numbers)). The processing hitherto is as same as in the embodiment 1.

Next, the contactless IC card 200 judges the timing (slot) to be response by means of the self-response timing judging means 520. That is to say, on the basis of the time the initial request is received and the generated random number (R), the self-response timing judging means 520 calculates the timing that the contactless IC card 200 should response, and then judges if there is a enough time (a specific time) until the timing that the contactless IC card 200 should response (FIG. 8: S806). Besides, the enough time is equivalent to a time needed for generating and storing the provisional random numbers.

Here, if it is judged that there is an enough time, the control means 503 instructs the provisional random number generating means 504 to generate the provisional random number (r), and stores the generated provisional random number in the provisional random number storage means 505 (FIG. 8: S806, NO to S807 to S809).

On the other hand, if it is judged that there is not enough time, the control means 503 performs the initial response at the slot based on the generated random number (R) (FIG. 8: S806 YES to S809).

After completing the initial response or generating the provisional random number, the control means 503 judges the end of the time slot period. The time slot period is from the start of the first time slot and to the end of the last time slot, and determined by the slot numbers given from the reader/writer 100.

If within the time slot period, it repeats from the judgment by the self-response timing judging means 520 (FIG. 8: S810 YES to S806).

If not within the time slot period, it returns to the step of waiting for the initial request and being ready to receive the initial request (FIG. 8, S810 NO to S803).

As described above, by judging if there is the specific time by the time to be respond by the card itself, it is possible to generate the provisional random number at the slot that is an actual waiting time without concerning to the card itself.

In addition, by using a nonvolatile memory as the provisional random number storage means, even in a case that there is not enough time to generate the provisional random number for the period from the time of activating programs to the time of receiving the initial request, for example, because the provisional random number has been generated already. Therefore it is possible to response by using the high-grade random number.

Besides, it is needless to say that the techniques described in the embodiment 3 can be applied to a case of comprising a plurality of provisional random number storage means.

[Embodiment 4]

The following explains about the embodiment 4 of the invention.

Figure 9:
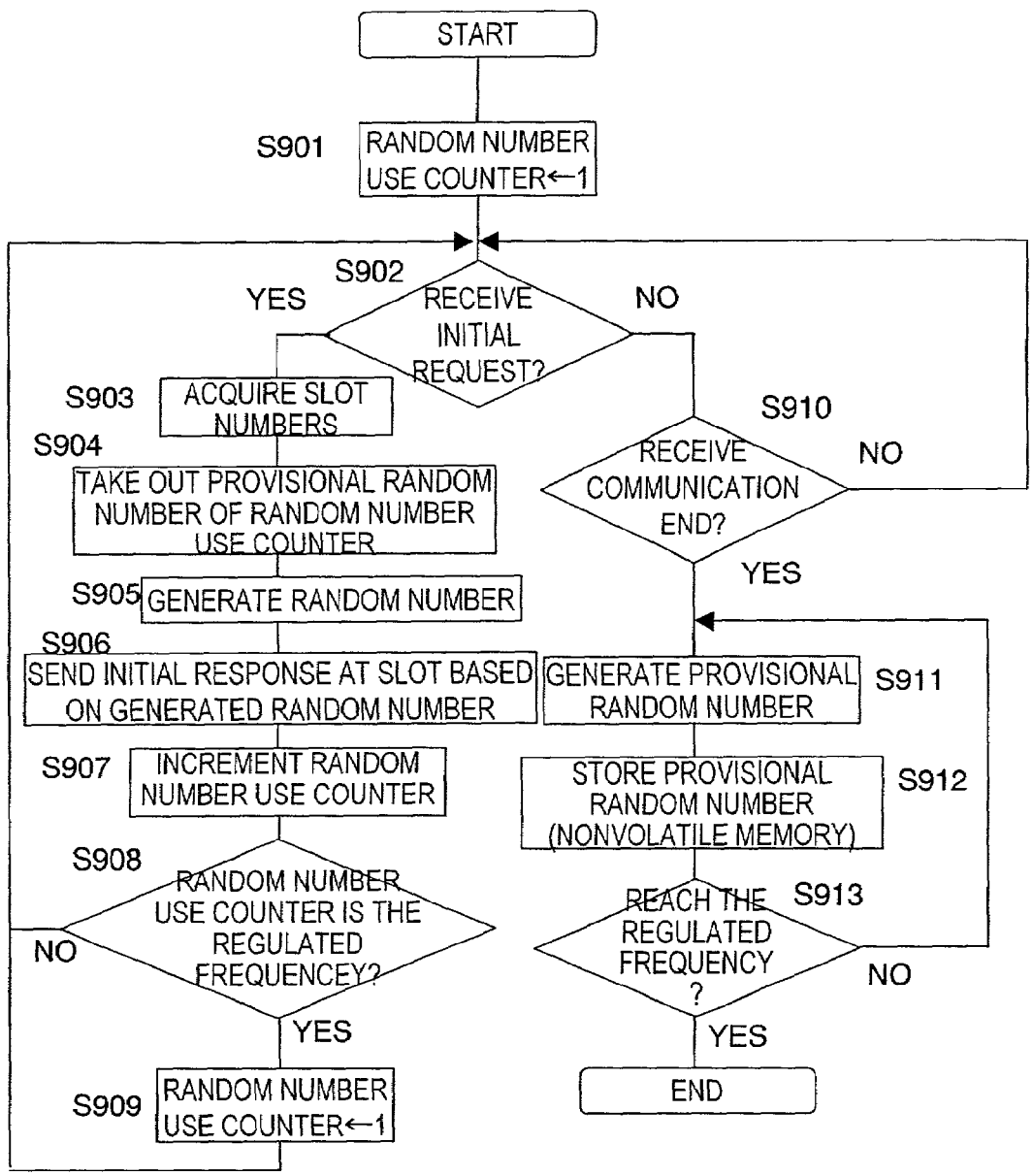
FIG. 9 is a flowchart of the initial response processing executed by a contactless IC card of the embodiment 4.

FIG. 9 is a flowchart of the communication of the contactless IC card 200 in the embodiment of the invention.

As described before, there is a problem that the contactless IC card of the embodiment 1 cannot perform a succeeding initial response in the following case: that is to say, when the reader/write resends the initial request immediately after the contactless IC card responds to the prior initial request, if the contactless IC card is in the processing for generating the provisional random number, the contactless IC card cannot sends the next initial response. And there is another problem in the embodiment 2 that it takes a specific time for the contactless IC card to be ready for receiving the initial request because generating a plurality of random numbers needs the processing time. In order to settle those problems, it is arranged in the embodiment 4 that the contactless IC card is provided with the provisional random number storage means 505 configured by a nonvolatile memory. Besides the contactless IC card in the embodiment 4 is configured as same as that of the embodiments 1, 2 and 3, so that the following explanation may refer to different points.

First, the control means 503 initializes the random number use counter to 1 (FIG. 9: S901).

Secondly, after receiving the initial request, the slot number calculation means 508 acquires the slot numbers from the initial request (FIG. 9: S902, YES to S903).

Subsequently, the control means 503 takes out the provisional random number (r(n)) corresponding to the value indicated by the random number use counter and stored in the nonvolatile provisional random number storage means 505, and then the random number generating means 507 generates a random number (R) based on the provisional random number (r) and the slot numbers (N) (FIG. 9: S904 to S905). Besides, the process for storing the provisional random number (r(n)) will be described later.

According to the above steps, the contactless IC card 200 can acquire the desired random number (from 1 to N (slot numbers)). After that, the contactless IC card 200 performs the initial response to the reader/writer 100 at the timing (slot) based on the random number (FIG. 9: S906).

After the initial response, the control means 503 increments the value of the random number use counter by 1 (+1) (FIG. 9: S907).

Here, when the value of the random number use counter is the regulated or less frequency for generating the random number, the control means 503 waits again in order to receive the initial request (FIG. 9: S908, NO to S902).

When the value of the random number use counter is no less than the regulated frequency for generating the random number, the control means 503 initializes the random number use counter to 1 and waits again in order to receive the initial request (FIG. 9: S908, YES to S909 to S902).

The above-mentioned steps are the same as those from S704 to S702 in the embodiment 2.

Figure 10:
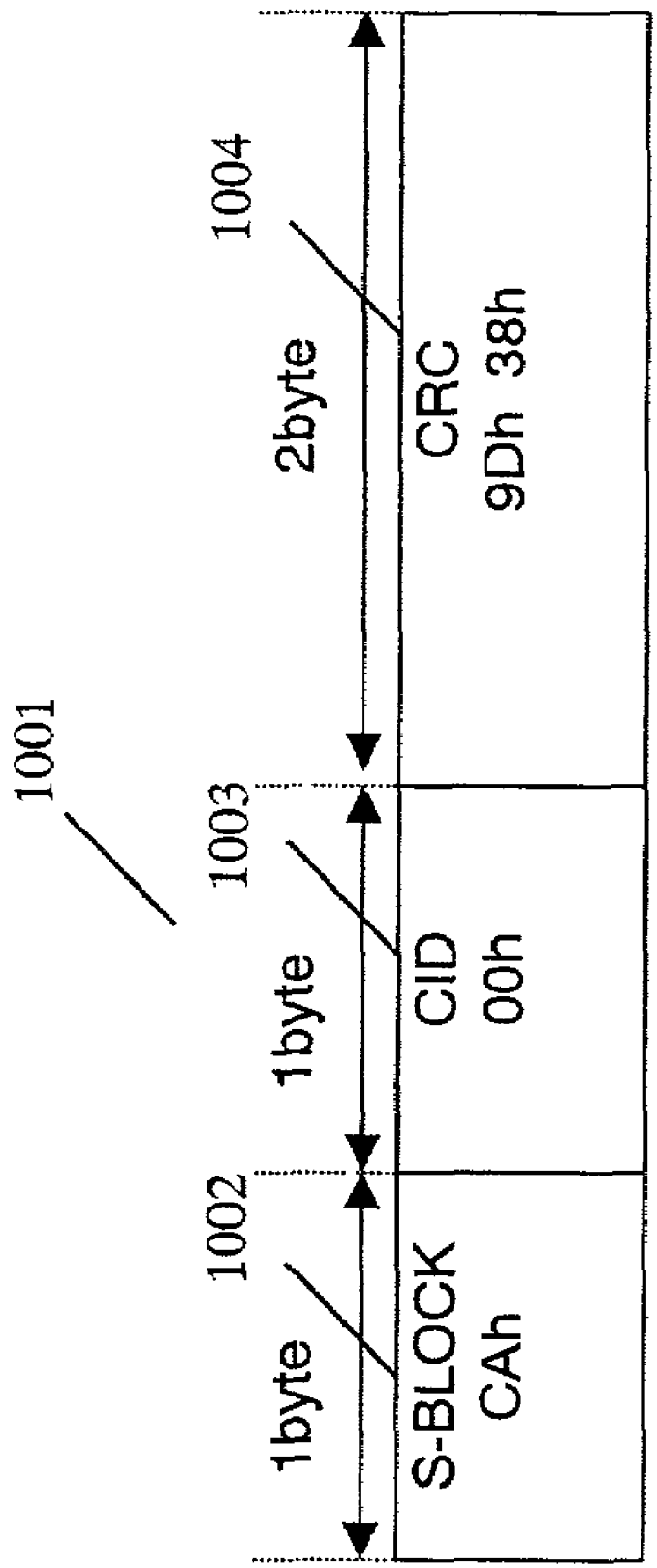
FIG. 10 is a diagram of a format of a request to end the communication.

By the way, when the control means 503 does not receive the initial request after initializing the random number use counter to 1, the control means 503 determines that the communication end request 1001 is received (FIG. 9: S902, NO to S910). The communication end request 1001 comprises a format as shown in FIG. 10 and is the information that is sent from the reader/writer 100 at the end of the communication between the reader/writer 100 and the contactless IC card 200. The communication end request 1001 comprises respective fields of S-BLOCK 1002, CID (card ID) 1003, and CRC 1004. The S-BLOCK 1002 stores the system command (the communication end); the CID 1003 stores the card ID of the contactless IC card 200; and the CRC 1004 stores respective CRC of the S-BLOCK 1002 and CID 1003.

Here, when the control means 503 does not receive the communication end request from the reader/writer 100, it returns the step for waiting the initial request (or other requests that are not shown in FIG. 9) (FIG. 9: S910, NO to S902).

However, after receiving the communication end request, the provisional random number generating means 504 generates the provisional random number (r(n)) in order to represent the end of the communication between the reader/writer 100 and the contactless IC card 200 (FIG. 9: S911). The "n" represents the n-th frequency for generating the provisional random number and is a value from 1 to the regulated frequency for generating the provisional random number, which are the same as in the embodiment 2. The provisional random number (r(n)) generated by the provisional random number generating means 504 is stored in the nonvolatile provisional random number storage means 505 (FIG. 5: S912).

The control means 503 judges if the frequency for generating the provisional random number reaches the regulated one, or not.

If the frequency for generating the provisional random number does not reach the regulated one, the provisional random number generating means 504 performs the generation of the provisional random number (FIG. 9: S913, NO to S911).

Besides, if the frequency for generating the provisional random number reaches the regulated one, the system stops (the processing ends).

As described above, after the contactless IC card ends the communication with the reader/writer and if the contactless IC card is placed within the communication area, the electric power can be provided to the contactless IC card. Accordingly, it is possible to generate the provisional random number in advance. In addition, since the generated provisional random number is stored in the nonvolatile storage means, as soon as the contactless IC card enters in the communication area of the reader/writer, the contactless IC card can generate the high-grade random number. Therefore, it is possible to reduce the operations like at the time of activating programs, and thereby it is possible to shorten the time to be ready for waiting for the initial request moreover.

[Embodiment 5]

The following is the explanation about the embodiment 5 of the invention.

Figure 12:
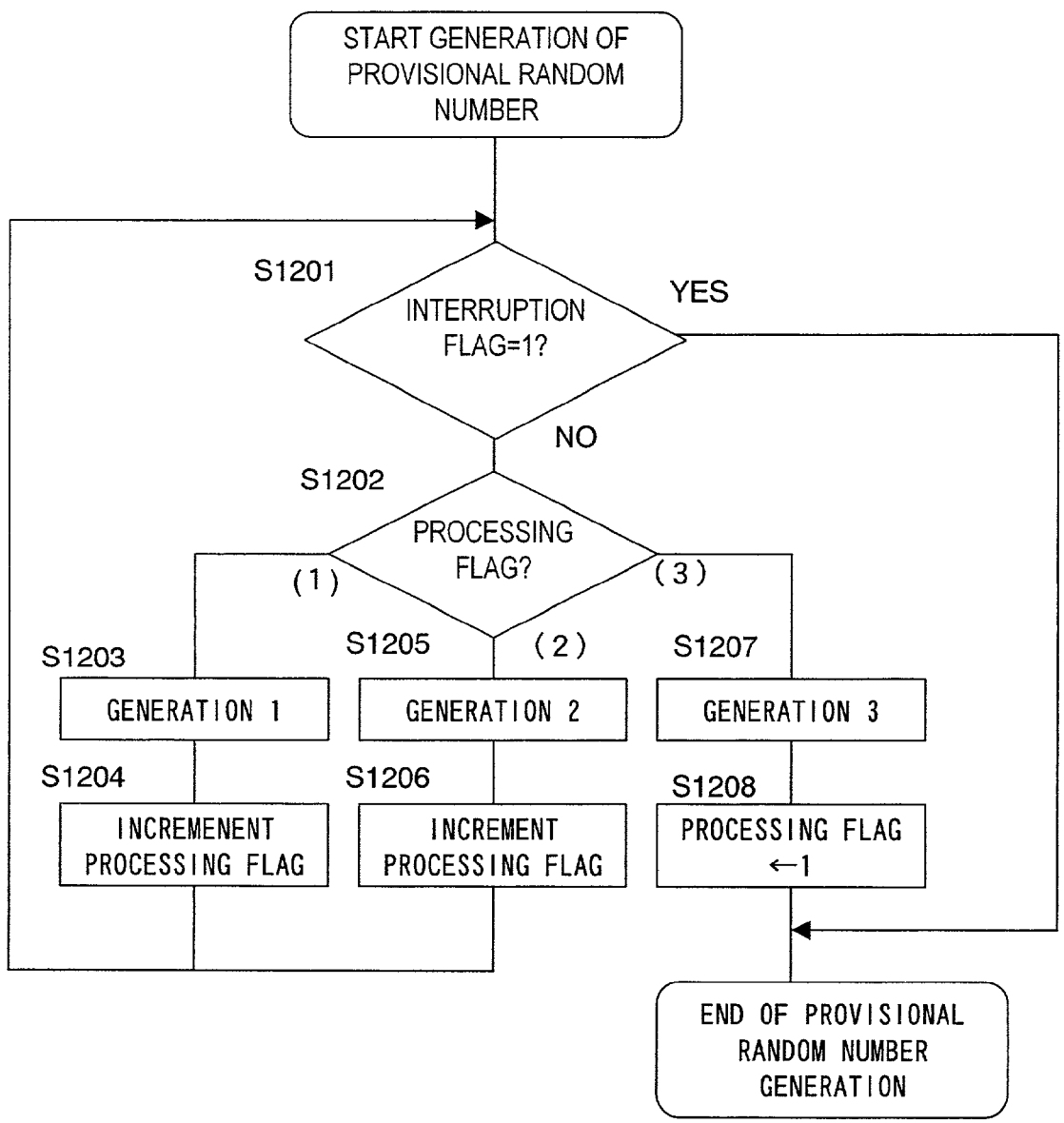
FIG. 12 is a flowchart showing the processing generating the provisional random number of the embodiment 5.

FIG. 11(*a*) shows the initialization processing of the contactless IC card 200, and FIG. 11(*b*) shows the processing at the interrupting of the contactless IC card. FIG. 12 shows the processing for generating the provisional random number.

The contactless IC card of the embodiment 5 sends the initial response in the same way as the embodiments 1 to 4. However, in this embodiment, it is possible to interrupt the generation of the provisional random number. In other words, the technology described in the embodiment 5 is combined with those of the embodiments 1 to 4, so that it may enables to interrupt and start the generation of the provisional random number freely.

The control means 503 performs the initialization of the contactless IC card 200 at the specific timing like the time of activating programs. The initialization is a processing to set "1" on a processing flag (a flag representing a state of processing) and to set "0" on an interruption flag (a flag representing whether the processing for generating the provisional random number should be interrupted or not) (FIG. 11(*a*): S1101 to S1102).

The processing flag is a variable indicating the stages of the processing for generating the provisional random number. For instance, assuming that the processing for generating the provisional random number is defined as three stages, such as the generation 1, the generation 2, and the generation 3, when the processing flag is "1", it is defined as a stage in the generation 1, when the processing flag is "2", it is defined as a stage in the generation 2, and when the processing flag is "3", it is defined as a stage in the generation 3. Besides, the generations 1 to 3 are defined by dividing the processing needed for generating the provisional random number (r) into three stages that can be interrupted. It is arranged in this embodiment that the processing is divided into three stages; but the number of the stages may be divided into two or more.

The interruption flag is a variable changed by interrupting into the control means 503. If the value of the interruption flag is "0", it means that it is not necessary to interrupt the generation of the random number, if the value of the interruption flag is a value other than "1", it means that it is necessary to interrupt the generation of the random number. The interruption flag is allocated in the RAM 505 of the contactless IC card 200 together with the processing flag.

The above steps are the preparations for the generation of the provisional random number.

Next, when the request (command) is sent from the reader/writer, the control means 503 judges the content of the request (command) (FIG. 11(*b*): S1110). Besides, it is general that the request is sent at any time and is processed at the interruption processing.

When the request (command) is the initial request, the control means 503 sets 1 on the interruption flag (FIG. 11(*b*): S1110, YES to S1111).

When the request (command) is the initial request, the control means 503 sets "1" on the interruption flag (FIG. 11(*b*): S1110, YES to S1111).

When the request (command) is not the initial request, the control means 503 sets "0" on the interruption flag (FIG. 11(*b*): S1110, NO to S1112).

The above-mentioned steps are the processing executed at the interruption.

The following is an example of the processing when the provisional random number generating means 504 in the embodiments 1 to 4 generates the provisional random number.

First, when the provisional random number generating means 504 generates the provisional random number, it is judged according to the interruption flag if the processing should be interrupted or not (FIG. 12: S1201).

Here, when the interruption flag is "1", the processing for generating the provisional random number is interrupted because the initial request has been received (FIG. 12: 1201, YES to the end of the provisional random number generation).

Here, when the interruption flag is "0", the processing for generating the provisional random number is executed by the provisional random number generating means because the initial request has not received yet, (FIG. 12: 1201, NO to S1202).

In the next step, since the processing for generating the provisional random number is divided into three stages, the control means 503 judges on the basis of the value of the processing flag which stage of the three stages should be operated (FIG. 12: S1202).

When the processing flag is 1, the generation 1 that is the first operation is executed. After such generation, the value of the processing flag is incremented (+1) in order to record the execution of the second generation for the provisional random number (FIG. 12: S1202(1) to S1203 to S1204). Likewise, the following generation 2 (FIG. 12: S1202(2) to S1205 to S1206) and the following generation 3 (FIG. 12 S1202(3) to S1207) are executed respectively. After completing the generation 3, the value of the processing flag is initialized, that is to say, the processing flag is set by 1, and thereby the generation of the provisional random number is completed (FIG. 12: S1208).

As described above, the processing for generating the provisional random number divided into a plurality of interruptive operations can be interrupted or restarted on the basis of the interruption flag and the processing flag; thereby, even when the reader/writer sends the initial request while the provisional random number generating means is generating the provisional random number, the contactless IC card can send the initial response by interrupting the generation of the provisional random number and immediately after that, the provisional random number generating means can restart the generation of the provisional random number. Therefore, it is possible to reduce the processing like at the time of activating programs.

Even for the time that the reader/writer is providing the electric power to the contactless IC card and the contactless IC card does not need to perform any other processing, that is to say, for the waiting time, it is possible to always generate the provisional random number.

Regarding the technologies described in the embodiments 1 to 5, in case where a contactless IC card stores in the nonvolatile memory the random number generated in advance, it happens that the random number does not exist when the contactless IC card is used first. Moreover, when the provisional random number must be generated until the initial request, it happens that the contactless IC card cannot send the response to the first initial request immediately after entering into the communication area of the reader/writer. In those cases, the contactless IC card cannot respond to the first initial request.

Therefore, the following countermeasures can be taken against the above cases. That is to say, in order to cope with the above cases, specific slot number storing means is provided in the ROM 409 and Ram 410 in advance, and then the specific slot number has been stored in the specific slot number storing means. The slot number may be a value not requiring any calculation.

Next, when the initial request is received from the reader/writer while the provisional random number is being generated, and when the control means 503 determined that no valid provisional random number is stored in the provisional random number storage means 505, the control means 503 makes a response by using a value stored in the specific slot number storing means.

According to the above steps, even when no valid provisional random number is stored in the provisional random number storage means, it is possible to make a response to the initial request within a specific time. Besides, in order to interrupt the generation of the provisional random number by the provisional random number generating means at receiving the initial request, it is preferable that the processing for generating the provisional random number should be interrupted by using the interruption flag and the processing flag.

Moreover, by setting 1 on a value to be stored in the specific slot number storing means the initial response is performed at the slot 1, so that other slots can be used for the calculation of the provisional random number. Therefore, even if response signals from other contactless IC cards in response to the initial request are in collision with each other, it is possible to ensure the time enough to respond to the second initial request, such time for generating the provisional random numbers.

The above-mentioned embodiments 1 to 5 are explained assuming that the invention adopts the time slot method. However, the invention can be applied to the slot marker method.

As described above, by dividing the generation of the random number and reducing the load of the operations for generating the random number after receiving the request, it is possible to satisfy the time regulation of the time slot. Since the processing with huge operation volume and capable of generating the high-grade random number can be applied to the generation of the random number, it is possible to settle the problem caused by the low-grade random number.

Since the high-grade random number can be acquired by software instead of hardware for generating the random number, it is possible to reduce the cost of the contactless IC card. In addition, it will not happen the problems caused by the design and the strength by using the hardware.

What is claimed is:

1. A contactless integrated circuit (IC) card responding to a request sent from a reader/writer by using a response timing calculated on the basis of slot numbers included in the request and a random number, the contactless IC card comprising:

a provisional random number generating unit operable to generate a plurality of provisional random numbers according to a part of calculations to be used for generating a random number;

a provisional random number storage unit operable to store the plurality of provisional random numbers generated by the provisional random number generating unit;

a random number generating unit operable to generate a random number on the basis of one of the stored provisional random numbers selected in sequential order at the time of receiving the request from the reader/writer; and a self-response timing judging unit operable to judge if there is time needed for generating and storing the plurality of provisional random numbers until timing to respond by the card itself, wherein the provisional random number generating unit generates the provisional random number if the self-response timing judging unit judges that there is the time needed for generating and storing the plurality of provisional random numbers until the response timing, and wherein the self-response timing judging unit judges if there is the time needed for generating and storing the plurality of provisional random numbers between receiving the request from the reader/writer and the response to the request.

2. The contactless IC card according to claim 1, wherein the provisional random number storage unit is nonvolatile, the provisional random number generating unit generates the plurality of provisional random numbers at the end of communication for using in a future response and stores the plurality of provisional random numbers in the nonvolatile provisional random number storage unit, and the random number generating unit generates a random number on the basis of one of the provisional random numbers stored in the nonvolatile provisional random number storage unit when receiving the request.

3. A contactless integrated circuit (IC) card responding to a request sent from a reader/writer by using a response timing calculated on the basis of slot numbers included in the request and a random number, the contactless IC card comprising:
- a provisional random number generating unit operable to generate a provisional random number according to a part of operations to be used for generating a random number;
- a provisional random number storage unit operable to store the provisional random number generated by the provisional random number generating unit;
- a random number generating unit operable to generate a random number on the basis of the stored provisional random number at the time of receiving the request from the reader/writer;
- an interruption flag representing that the processing for generating provisional random numbers should be interrupted when the request from the reader/writer is received in the middle of the provisional random number generation;
- a processing flag representing a position from which the provisional random number generation should be restarted after the end of the response to the request; and
- a specific slot number storing unit operable to store a specific value,
- wherein the provisional random number generation should be interrupted or restarted on the basis of the interruption flag and the processing flag, and
- wherein the provisional random number generating unit interrupts the processing for generating provisional random numbers when the request from the reader/writer is received in the middle of the provisional random number generation and then makes a response to that request based on the specific value stored in the specific slot number storing unit.

4. The contactless IC card according to claim 3, wherein a value stored in the specific slot number storing unit is 1.

5. A responding method of contactless integrated circuit (IC) card responding to a request sent from a reader/writer by using a response timing calculated on the basis of slot numbers included in the request and a random number, the method comprising the steps of:
- generating a plurality of provisional random numbers according to a part of calculations to be used for generating a random number;
- storing the plurality of provisional random numbers generated by the provisional random number generating step;
- generating a random number on the basis of one of the stored provisional random numbers selected in sequential order at the time of receiving the request from the reader/writer; and
- judging if there is time needed for generating and storing the plurality of provisional random numbers until timing to respond by the card itself,
- wherein the provisional random number generating step generates the provisional random number if the judging step judges that there is the time needed for generating and storing the plurality of provisional random numbers until the response timing, and
- wherein the judging step judges if there is the time needed for generating and storing the plurality of provisional random numbers between receiving the request from the reader/writer and the response to the request.

6. A computer program product having a program executed by a contactless integrated circuit (IC) card responding to a request sent from a reader/writer by using a response timing calculated on the basis of slot numbers included in the request and a random number, the program, when executed, causing the contactless IC card to perform the steps of:
- generating a plurality of provisional random numbers according to a part of calculations to be used for generating a random number;
- storing the plurality of provisional random numbers generated by the provisional random number generating step;
- generating a random number on the basis of one of the stored provisional random numbers selected in sequential order at the time of receiving the request from the reader/writer; and
- judging if there is time needed for generating and storing the plurality of provisional random numbers until timing to respond by the card itself,
- wherein the provisional random number generating step generates the provisional random number if the judging step judges that there is the time needed for generating and storing the plurality of provisional random numbers until the response timing, and
- wherein the judging step judges if there is the time needed for generating and storing the plurality of provisional random numbers between receiving the request from the reader/writer and the response to the request.

7. A computer readable medium for storing a program executed by a contactless integrated circuit (IC) card responding to a request sent from a reader/writer by using a response timing calculated on the basis of slot numbers included in the request and a random number, the program, when executed, causing the contactless IC card to perform the steps of:
- generating a plurality of provisional random numbers according to a part of calculations to be used for generating a random number;
- storing the plurality of provisional random numbers generated by the provisional random number generating step;
- generating a random number on the basis of one of the stored provisional random numbers selected in sequential order at the time of receiving the request from the reader/writer; and
- judging if there is time needed for generating and storing the plurality of provisional random numbers until timing to respond by the card itself,
- wherein the provisional random number generating step generates the provisional random number if the judging step judges that there is the time needed for generating and storing the plurality of provisional random numbers until the response timing, and
- wherein the judging step judges if there is the time needed for generating and storing the plurality of provisional random numbers between receiving the request from the reader/writer and the response to the request.

8. A responding method of contactless integrated circuit (IC) card responding to a request sent from a reader/writer by using a response timing calculated on the basis of slot numbers included in the request and a random number, the method comprising the steps of:

generating a provisional random number according to a part of operations to be used for generating a random number;

storing the provisional random number generated by the provisional random number generating step;

generating a random number on the basis of the stored provisional random number at the time of receiving the request from the reader/writer;

setting an interruption flag representing that the processing for generating provisional random numbers should be interrupted when the request from the reader/writer is received in the middle of the provisional random number generation;

setting a processing flag representing a position from which the provisional random number generation should be restarted after the end of the response to the request; and storing a specific value in a specific slot number storing unit;

wherein the provisional random number generation should be interrupted or restarted on the basis of the interruption flag and the processing flag, and wherein the provisional random number generating step interrupts the processing for generating provisional random numbers when the request from the reader/writer is received in the middle of the provisional random number generation and then makes a response to that request based on the specific value stored in the specific slot number storing unit.

9. A computer program product having a program executed by a contactless integrated circuit (IC) card responding to a request sent from a reader/writer by using a response timing calculated on the basis of slot numbers included in the request and a random number, the program, when executed, causing the contactless IC card to perform the steps of:

generating a provisional random number according to a part of operations to be used for generating a random number;

storing the provisional random number generated by the provisional random number generating step;

generating a random number on the basis of the stored provisional random number at the time of receiving the request from the reader/writer;

setting an interruption flag representing that the processing for generating provisional random numbers should be interrupted when the request from the reader/writer is received in the middle of the provisional random number generation;

setting a processing flag representing a position from which the provisional random number generation should be restarted after the end of the response to the request; and storing a specific value in a specific slot number storing unit;

wherein the provisional random number generation should be interrupted or restarted on the basis of the interruption flag and the processing flag, and wherein the provisional random number generating step interrupts the processing for generating provisional random numbers when the request from the reader/writer is received in the middle of the provisional random number generation and then makes a response to that request based on the specific value stored in the specific slot number storing unit.

10. A computer readable medium for storing a program executed by a contactless integrated circuit (IC) card responding to a request sent from a reader/writer by using a response timing calculated on the basis of slot numbers included in the request and a random number, the program, when executed, causing the contactless IC card to perform the steps of:

generating a provisional random number according to a part of operations to be used for generating a random number;

storing the provisional random number generated by the provisional random number generating step;

generating a random number on the basis of the stored provisional random number at the time of receiving the request from the reader/writer;

setting an interruption flag representing that the processing for generating provisional random numbers should be interrupted when the request from the reader/writer is received in the middle of the provisional random number generation;

setting a processing flag representing a position from which the provisional random number generation should be restarted after the end of the response to the request; and storing a specific value in a specific slot number storing unit;

wherein the provisional random number generation should be interrupted or restarted on the basis of the interruption flag and the processing flag, and wherein the provisional random number generating step interrupts the processing for generating provisional random numbers when the request from the reader/writer is received in the middle of the provisional random number generation and then makes a response to that request based on the specific value stored in the specific slot number storing unit.

* * * * *